April 29, 1941.  C. L. RAISER  2,240,020
PLATE
Filed May 12, 1937
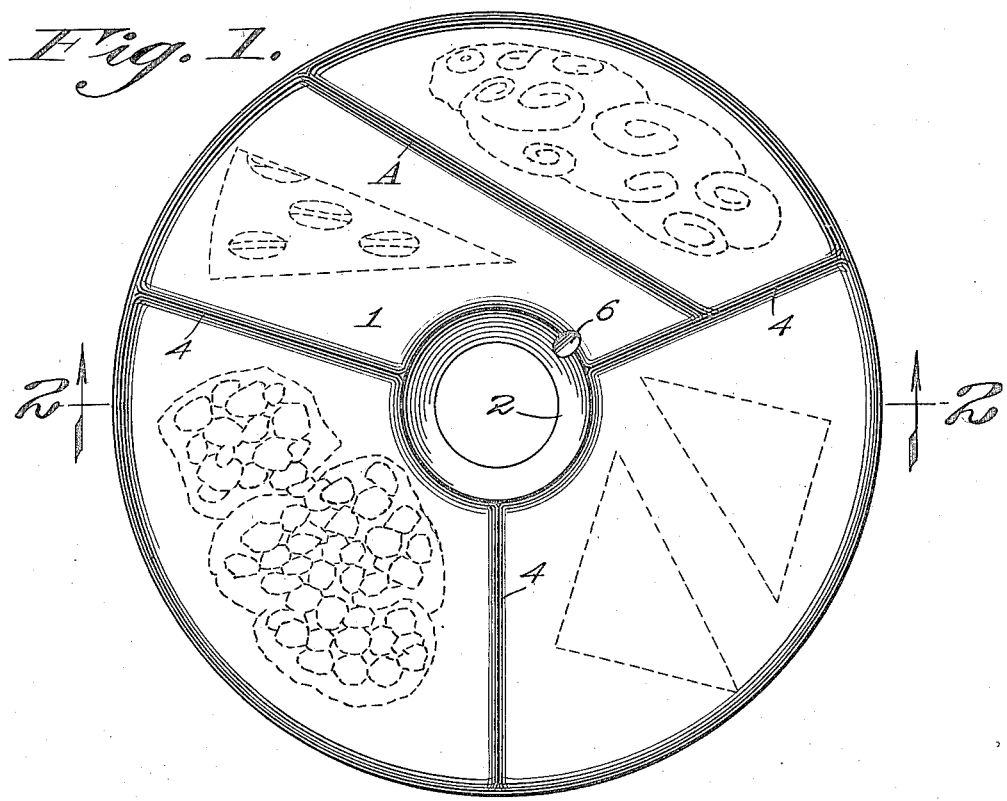
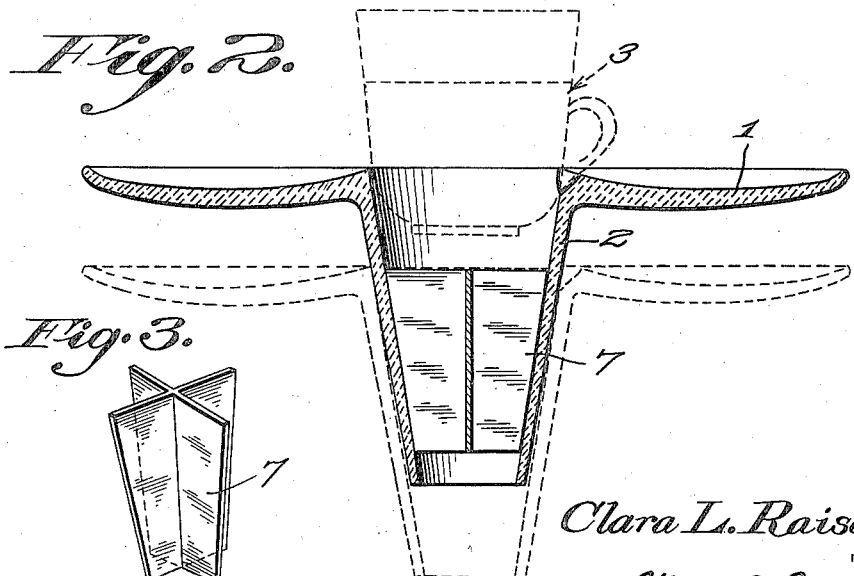
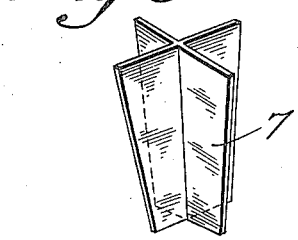
Clara L. Raiser
INVENTOR
BY Victor J. Evans & Co.
ATTORNEYS
WITNESS Patented Apr. 29, 1941

2,240,020

UNITED STATES PATENT OFFICE 2,240,020

PLATE

Clara L. Raiser, Willow Grove, Pa.

Application May 12, 1937, Serial No. 142,293

2 Claims. (Cl. 65—15)

This invention relates to plates for serving drinks and food to guests at receptions and like parties, and has for the primary object the provision of a device of this character which may be easily held in a person's hand, leaving the other hand free, and on which may be placed foods and a drink without the foods becoming mixed and which will provide an efficient rest for the glass or cup containing the drink to eliminate any possibility of spilling it.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a dish constructed in accordance with my invention.

Figure 2 is a sectional view taken on the line 2—2 of Figure 1.

Figure 3 is a perspective view illustrating a lift or spacer to be used in connection with my invention when the liquid container such as a glass or cup extends too far into the hollow handle of the device.

Referring in detail to the drawing, the numeral 1 indicates the body of the dish which may be of any desired shape and has formed centrally thereon a tapering hollow handle 2 opening outwardly through the top face of the body to form a rest or seat for a liquid container 3 such as a cup or drinking glass, as shown in dotted lines in Figure 2. Preferably, the hollow handle 2 is also open at its lower end as shown. The top face of the body has formed thereon a plurality of ribs 4 extending radially from the handle to the outer edge of the body. The top face of the body between the ribs is concaved or dished so that different kinds of foods may be positioned in the spaces between the ribs. A rib, as shown at A, extends from one of the other ribs to the edge of the body. The food spaces as provided on the body prevent the different kinds of foods from contacting or mixing with each other. The upper open end of the handle which acts as a rest or seat for the liquid container has a notch 6 formed therein to receive the handle of the liquid container.

Dishes of the character described can be readily nested into one another as suggested in Figure 2 and they provide an efficient means on which different kinds of foods can be served to persons along with drinks or liquids in containers permitting the persons to easily support the devices by grasping the handles with one of their hands. The other hands of the persons are free to handle the liquid container and the food on the dish and such persons also may readily shake hands with others or accept additional food while carrying the dishes.

A spacer or lift 7 may be positioned in the handle should the container extend down in the handle to a distance which would be inconvenient. The spacer or lift is readily removed.

What is claimed is:

1. The herein described food and refreshment server, comprising a dished main body portion having a central, downwardly extended, tapered, hollow handle, said handle being open at its opposite ends and the upper opening being through the body portion to receive and support therein a separate, detachable, liquid container, coinciding edges of the handle and body portion being notched to receive therein a handle extension of the liquid container.

2. The herein described food and refreshment server, comprising a dished main body portion having a central, downwardly extended, tapered, hollow handle, said handle being open at its opposite ends and the upper opening being through the body portion to receive and directly support therein a separate, detachable, liquid container of certain form and diametrical dimensions, and a correspondingly tapered spacer element detachably receivable supportingly in said hollow handle to provide a rest below the upper end of the handle for a liquid container received in the handle and of lesser outside diameter throughout its inserted portion than the interior diameter of the receiving portion of the handle.

CLARA L. RAISER.